United States Patent [19]

Adams, Jr.

[11] Patent Number: 4,789,728

[45] Date of Patent: Dec. 6, 1988

[54] POLYARYLOXYPHOSPHAZENE CAUSTIC WASH

[75] Inventor: J. Robert Adams, Jr., Baton Rouge, La.

[73] Assignee: Ethyl Corporation, Richmond, Va.

[21] Appl. No.: 42,989

[22] Filed: Apr. 27, 1987

[51] Int. Cl.$^4$ .............................................. C08G 73/00
[52] U.S. Cl. .................................... 528/489; 528/168; 528/398; 528/399; 528/488; 528/496
[58] Field of Search ............... 528/489, 488, 496, 168, 528/495, 398, 399

[56] References Cited

U.S. PATENT DOCUMENTS 4,663,420 5/1987 Chang ................................ 528/168

Primary Examiner—Harold D. Anderson
Attorney, Agent, or Firm—Joseph D. Odenweller

[57] ABSTRACT

Phenolic impurities are removed from polyaryloxyphosphazenes by extracting a solution of the crude polyaryloxyphosphazene with an aqueous lower alcohol alkali metal base solution such as aqueous methanolic sodium hydroxide.

12 Claims, No Drawings

POLYARYLOXYPHOSPHAZENE CAUSTIC WASH

BACKGROUND

Polyaryloxyphosphazenes are inherently fire resistant and exhibit very low smoke emission when exposed to fire. They are readily compounded with conventional filters, stabilizers, processing aids, dyes and the like. They are readily cured by peroxides and if they contain some unsaturation, can be cured by sulfur using conventional rubber vulcanizing systems. They are readily foamed and produce excellent fire-resistant, low-smoke, thermal insulating foam which can be used to insulate pipes or walls where such special properties are desired.

Polyaryloxyphosphazenes are conventionally made by reacting a solution of high molecular weight substantially linear polyphosphonitrilic chloride with a solution of an alkali metal phenoxide or substituted phenoxide. Residual alkali metal phenoxide can be neutralized with an acid such as sulfuric acid leaving an impure polyaryloxyphosphazene solution which contains inorganic salts such as sodium chloride and sodium sulfate as well as phenol and/or substituted phenols. Juneau U.S. Pat. No. 4,576,806 discloses a process for removing the inorganic salts by treatment of the neutralized polyaryloxyphosphazene solution with water containing a lower alcohol. This treatment has been found to be very effective in lowering the inorganic salt content of the polyphosphazene.

Polyaryloxyphosphazenes are made using a small stoichiometric excess of alkali metal phenoxide or substituted phenoxides in order to react all or substantially all of the phosphorus-bound chlorine. Upon neutralization in the salt removal stage the phenoxides revert to phenol and substituted phenols. If left in the polymer these impurities impart an objectionable phenolic odor and also result in inferior final products. Therefore, a need exists for a method for removing the phenolic impurities from crude polyaryloxyphosphazene gum.

SUMMARY

It has now been discovered that phenolic impurities can be efficiently removed from polyaryloxyphosphazenes by extracting a solution of the polyaryloxyphosphazene gum with an aqueous lower-alcohol alkali metal base such as aqueous methanolic caustic. It is surprising that this procedure is so effective without degrading the polymer because Allcock "Phosphorus Nitrogen Compounds," page 144, Academic Press, N. Y. (1972) reports that aryloxycyclophosphazenes are hydrolyzed in basic media by cleavage of an aryloxy group from phosphorus and replacement with OH or ONa.

DESCRIPTION OF THE PREFERRED EMBODIMENTS

A preferred embodiment of the invention is a process for removing phenolic impurities from a crude polyphosphazene having aryloxy substituents and containing phenolic impurities by (a) forming a solution of the crude polyphosphazene in a solvent for said crude polyphosphazene, (b) extracting the crude polyphosphazene solution at least once with an aqueous lower alcohol solution of an alkali metal base to extract the phenolic impurities into the aqueous lower alcohol phase, (c) separating the organic phase containing the purified polyaryloxyphosphazene from the aqueous lower alcohol phase and (d) recovering purified polyaryloxyphosphazene gum from the organic phase.

Polyarlyoxyphosphazenes are well-known materials. They are briefly described in Allcock, "Phosphorus Nitrogen Compounds" Academic Press, N.Y. (1972) p. 361. A method of making polyalkylphenoxyphosphazene is taught in Reynard et al. U.S. Pat. No. 3,853,794. Polyaryloxyphosphazenes having both phenoxy and alkylphenoxy substituents are described in Rose et al. U.S. Pat. No. 3,856,713. Various polyhalophenoxyphosphazenes are disclosed in Reynard et al. U.S. Pat. No. 3,883,451. Polyaryloxyphosphazene foams are described in U.S. Pat. No. 3,994,838. Cheng et al. U.S. 4,116,785 describes certain polyaryloxyphosphazenes which contain unsaturate groups such as o-allylphenoxy groups in addition to phenoxy and alkyl phenoxy groups. These unsaturated polymers are readily cured by sulphur or by high energy radiation. Polyaryloxyphosphazenes which also contain other substituents on phosphorus are also included in the present invention. Reynard et al. U.S. Pat. No. 3,700,629 describes polyphosphazenes having both phenoxy and fluoroalkoxy substituents. Reynard et al. U.S. Pat. No. 3,856,712 describes polyphosphazenes having both alkoxy and aryloxy substituents. More recently Juneau U.S. Pat. No. 4,576,806 describes the preparation of various polyphosphazenes having phenoxy, alkylphenoxy and allylphenoxy substituent groups including an acidification and aqueous alcohol wash step to remove inorganic salt. All that is required for the invention to be useful is that the polyphosphazene contain at least some (e.g., at least 10 mole percent) aryloxy substituents on phosphorus and that the crude polyphosphazene contain phenolic impurities.

All of the foregoing references are incorporated herein by reference for their teaching of how to make and use polyphosphazanes having at least some aryloxy substituents on phosphorus.

As described in detail in the above patents, polyaryloxyphosphazenes are made by first forming a solution of a high molecular weight (e.g., 50,000–1,000,000 or higher) linear phosphonitrilic chloride in a solvent such as benzene, toluene, cyclohexane, tetrahydrofuran (THF), dimethoxyethane and the like. The more preferred solvents are the water-immiscible solvents such as toluene and most preferably cyclohexane. The phosphonitrilic chloride concentration can vary depending upon solubility in the solvent chosen. In general the concentration will be about 5–30 weight percent and more preferably about 10–20 weight percent.

A sodium aryloxide solution is made by reacting the desired arylhydroxy with sodium metal cut in small pieces or as a dispersion in an ether solvent such as THF, dimethoxyethane, dioxane, dimethylether of diethylene glycol and the like. The reaction proceeds with hydrogen evolution at room temperature but can be warmed to speed up the reaction rate.

If desired other hydroxy compounds can be included with the arylhydroxy compound to form a mixture of sodium aryloxides and sodium alkoxides, haloalkoxides (e.g., fluoroalkoxides), arylalkoxides, alkoxyalkoxides, polyalkoxyalkoxides and the like. Alternatively these other alkoxides can be prepared separately and either combined with the sodium aryloxide or added separately to the polyphosphonitrilic chloride solution to form polyphosphazenes having both aryloxy and other substituents. In any of the above procedures, unreacted aryloxides will remain in the reaction product which will form phenolic impurities upon hydrolysis. These phenolic impurities must be removed if a high quality polyphosphazene gum is required.

The sodium aryloxides and optionally alkoxides can be reacted with the phosphonitrilic chloride by merely mixing its aryloxide-ether solution with the polyphosphonitrilic chloride solution. Preferably the sodium aryloxide solution is added to the polyphosphonitrilic chloride solution while stirring. The temperature is maintained in the range of about 20° C. up to reflux. Stirring is then continued for an additional period of about 5 minutes to 2 hours to complete the substitution reaction.

The amount of sodium aryloxide and, if present, sodium alkoxide used in the substitution reaction is a slight stoichiometric excess over the amount required to react with all of the phosphorus-chloride groups in the polyphosphonitrilic chloride. Generally about 2–5 percent excess is used. This results in a product which, after hydrolysis, will contain phenolic impurities. When a mixture of alkoxides and aryloxides is used there will still be phenolic impurities in the resultant solution because the sodium aryloxides are less reactive than the sodium alkoxides and hence there will generally be at least some sodium aryloxides left unreacted. The solution of the polyaryloxyphosphazenes in a solvent is referred to as "cement."

Juneau U.S. Pat. No. 4,576,806 describes a process which at this stage neutralizes the reaction mixture with aqueous sulfuric acid containing a lower alcohol. This is very effective in removing inorganic salt but has little if any effect on the content of phenolic impurities. According to the present process, both salts and phenolics can be removed from polyaryloxyphosphazene cement by extracting the crude cement with aqueous loweralcohol alkali metal base. It is not necessary to first neutralize the crude cement as taught by Juneau although this can be done without detriment other than that which is inherent in an extra step.

The lower alcohols useful in the process are methanol, ethanol, isopropanol, n-propanol, tert-butanol and the like including mixtures thereof. The most preferred alcohols are methanol and isopropanol especially methanol.

The amount of alcohol in the aqueous alcohol can vary widely and some experimentation might be required with each different application to see what gives the best extraction of phenolics and cleanest phase separation of aqueous and organic phases. A useful alcohol concentration is about 10–60 weight percent and more preferably 10–50 weight percent. A still more preferred alcohol concentration is about 20–50 weight percent alcohol.

The amount of alcohol-water extraction solution should be sufficient to extract the phenolic impurities and separate into 15 two phases. A useful range is about 10–200 parts by weight extraction solution per 100 parts by weight polyaryloxyphosphazene cement. A more preferred amount is about 20–100 parts per 100 parts of cement and a most preferred amount is about 30–50 parts of water-alcohol solution per 100 parts of polyaryloxphosphazene cement.

The alkali metal base can be any strong base such as sodium carbonate, sodium bicarbonate, sodium hydroxide, potassium carbonate, potassium bicarbonate, potassium hydroxide and the like including mixtures thereof. The preferred bases are potassium hydroxide and sodium hydroxide and the most preferred is sodium hydroxide.

The amount of alkali metal base in the aqueous alcohol depends upon the amount of phenolic impurities to be removed but generally should be sufficient to provide about 5–50 milequivalents (meq) per 100 grams of polyaryloxyphosphazene cement. A more preferred range with sodium hydroxide is about 10–30 meq per 100 grams of polyaryloxyphosphazene cement.

When using aqueous methanolic sodium hydroxide as the extractant, the preferred composition is about 10–60 weight percent methanol and 0.1–5 weight percent sodium hydroxide and more preferably about 20–50 weight percent methanol at 0.5–3 weight percent sodium hydroxide and the balance water. Large amounts of inorganic base in the aqueous alcohol should be avoided as this may cause hydrolysis of the aryloxy groups.

The composition of the initial crude polyaryloxyphosphazene solution will be determined by the composition and amount of the alkali metal aryloxide solution and the polyphosphonitrilic chloride solution. As mentioned previously the resulting solution or cement will be about 5–30 weight percent and more often 10–20 weight percent polyaryloxyphosphazene and the balance will be solvents and impurities, e.g., inorganic salts, unreacted alkali metal aryloxides and sometimes alkali metal alkoxides and the like. Preferably a substantial portion of the solvent, at least 35 weight percent of the total solvent, will be a water immiscible solvent such as benzene, toluene, cyclohexane, xylene and the like, most preferably cyclohexane. The solvent contributed by the alkali metal aryloxide solution or solutions is generally an ether-type solvent such as THF which will be somewhat soluble in the aqueous alcoholic alkali metal base extractant and thus a portion of this solvent will be extracted into the aqueous phase along with the phenolic impurities.

As taught by Juneau U.S. Pat. No. 4,576,806 the inorganic salts may be initially removed from the crude cement by neutralizing this cement with acid and then extracting the salt with an aqueous alcohol solution. In the present process this neutralization-extraction step can be bypassed and both the salt and phenolic impurities removed by extracting the crude cement with an aqueous alcoholic alkali metal base as described above. This is the preferred mode of operation. In addition, the residual sodium chloride content of the polyaryloxyphosphazene cement formed in the substitution reaction is also extracted into the aqueous phase.

The extraction process is carried out by merely mixing the crude polyaryloxyphosphazene cement (either neutralized or preferably without neutralization) with the aqueous alcoholic alkali metal base and stirring the mixture. Stirring is stopped and the phases are allowed to separate and the lower aqueous phase removed. Alternatively the aqueous alcoholic alkali metal base-polyaryloxyphosphazene mixture can be separated by passing it through a continuous centrifuge.

Phenolic impurities can be lowered still further by repeating the aqueous alcoholic alkali metal base extraction until the phenolic content of the resulting polyaryloxyphosphazene gum obtained after removal of solvent from the cement is below about 1 weight percent, more preferably below about 0.15 weight percent and most preferably below about 0.075 weight percent.

Following the extraction(s) of phenolics with aqueous alcoholic alkali metal base, the polyphosphazene cement can be washed with aqueous lower alcohol which can optionally contain an acid such as sulfuric acid to neutralize the cement. The cement is then separated and the solvent removed by any conventional evaporation procedure such as by heating the cement under vacuum. The remaining polyaryloxyphosphazene is referred to at this stage as "gum" and can be blended with conventional compounding agents such asffillers (e.g., alumina trihydrate, silica, clay, carbon black, etc.) processing aids such as polyphosphazene oil, dyes, pigments, curing agents (e.g., sulfur, peroxides), accelerators, blowing agents and the like. The compounded gum can then be fabricated into its desired form and heated to cure the formed compound.

The following examples show how the extraction process is conducted and typical results to be expected.

EXAMPLE 1

A synthetic polyarlyoxyphosphazene substitution mixture (i.e., cement) was made by mixing 7.67 parts of high molecular weight linear polyaryloxyphosphazene gum (~50.6 mole percent phenoxy substituents, ~42.0 mole percent p-ethylphenoxy substituents and ~7.4 mole percent o-allylphenoxy substituents), 35.3 parts of cyclohexane, 52.95 parts of THF, 0.5 parts of phenol, 0.08 parts of p-ethylphenol, 0.05 parts of o-allylphenol and 3.45 parts of sodium chloride (all parts are by weight). This calculates to 7.6 weight percent phenolic impurities on a salt-free dry gum basis (i.e., ex-solvent).

To 141 parts of this mixture wa added 40 parts of 30 percent aqueous methanol (30 percent methanol) and 1.32 parts of 50 percent aqueous sodium hydroxide. This was agitated vigorously and then allowed to settle. After 1 hour, separation was not complete so 4.8 parts of additional methanol was added and the mixture stirred and then allowed to settle overnight. The next morning the organic phase was recovered and washed with 44.2 parts of 50 percent aqueous methanol. The mixture was allowed to separate. The organic phase (i.e., cement) then containing 10.8 weight percent gum, 0.0263 weight percent phenol, 0.0217 weight percent p-ethyl-phenol and 0.0267 weight percent o-allylphenol. On a dry gum basis (ex-solvents) this calculates to a total of 0.68 weight percent phenolic impurities, a 91 percent reduction from the initial 7.6 weight percent phenolics on the same dry gum basis.

EXAMPLE 2

To 155.7 parts of the same synthetic cement described in Example 1 was added 60.23 parts of 50 percent aqueous methanol, 1.34 parts of aqueous sodium hydroxide and 22.03 parts of water. This gave an extractant solution containing 36 weight percent methanol, 63.2 weight percent water and 0.8 weight percent sodium hydroxide. The mixture was stirred vigorously and allowed to separate. The organic phase (139.76 parts) was separated. An 81.8 part portion of the organic phase was extracted a second time with a mixture of 35.4 parts 50 percent aqueous methanol and 0.74 parts 50 percent aqueous sodium hydroxide. The resultant second extracting solution was 50 weight percent water, 49 weight percent methanol and 1.0 weight percent sodium hydroxide. This mixture was agitated thoroughly and then allowed to settle. The aqueous phase (52.1 parts) was removed and the remaining organic phase was extracted a third time with a mixture of 34.9 parts of 50 percent aqueous methanol and 0.4 grams of concentrated sulfuric acid to neutralize the cement. The resulting polyaryloxyphosphazene on a dry gum basis (ex-solvents) contained only 0.067 weight percent total phenolics, a 99 percent decrease from the initial crude gum on the same dry gum basis.

EXAMPLE 3

A large scale synthesis of polyaryloxyphosphazene was oonduoted by reaotinq a THF solution of sodium p-ethylphenoxide, sodium o-allylphenoxide and sodium phenoxide with a oyclohexane solution of high molecular weight linear polyphosphonitrilio chloride. This formed a cement containing 8.97 wt % polyaryloxyphosphazene, phenolic impurities, salt and solvents. A 4927.1 gram portion of the cement was extracted with 2726 gram of a solution of:
- 63.3 wt % water
- 36.1 wt % methanol
- 0.6 wt % NaOH The mixture was agitated about 17 minutes and then allowed to settle which was almost immediate. The aqueous phase was removed (3238.8 g) and the organic phase again extracted with a 1991.6 g of a solution consisting of:
- 49.5 wt % water
- 49.6 wt % methanol
- 0.9 wt % NaOH This mixture was agitated 15 minutes and then allowdd to settle. The aqueous phase (2696.1 g) was removed.

The remaining cement was then washed with 2249.8 g of a solution consisting of:
- 49.90 wt % water
- 49.94 wt % methanol
- 0.16 wt % $H_2SO_4$ It was observed that the cement was not mixing well with the aqueous phase. An additional 914.1 g of THF was added and mixing continued for 30 minutes. The mixture was allowed to separate. The aqueous phase was at pH =7.0. The aqueous phase (2900.4 g) was removed. After standing an additional 8 hours 45 minutes an additional 672.5 g of aqueous phase was removed. An additional 826.8 g of THF was added to the cement. The cement analyzed 11.14 wt % polyaryloxyphosphazene, 1.43 wt % water and the balance solvent plus phenolic impurities. The following table compares the analysis of the cement on a dry gum basis (ex, solvents and water) both before and after the aqueous alcoholic sodium hydroxide extraction.

| Impurity | Wt Percent (dry gum basis) | |
| --- | --- | --- |
|  | Before | After |
| phenol | 1.67 | 0.031 |
| p-ethylphenol | 0.48 | 0.012 |
| o-allylphenol | 0.02 | ND[1] |
| total | 2.15 | 0.043 |

[1]ND means none detected.

This represents a 98% reduction in the amount of phenolic impurities in the polyaryloxyphosphazene gum.

EXAMPLE 4

A 5614.2 g portion of the same initial cement used in Example 3 was extracted with 3105.7 g of a solution consisting of:
- 63.3 wt % water
- 36.14 wt % methanol
- 0.56 wt % NaOH The mixture was stirred 15 minutes and then allowed to settle. The aqueous phase (3801.7 g) was removed.

The remaining cement was washed with 2267.2 g of a solution consisting of:
- 49.5 wt % water
- 49.5 wt % methanol
- 1.0 wt % NaOH After 15 minutes stirring was stopped and the mixture allowed to settle. The aqueous phase (2890.8 g) was removed.

The remaining cement was then neutralized with 2250 g of a solution consisting of:
- 49.95 wt % water
- 49.91 wt % methanol
- 0.14 wt % $H_2SO_4$ On stirring, the cement did not mix well with the aqueous phase so 978.4 g THF was added. After 20 minutes stirring was stopped and the mixture allowed to settle. The aqueous phase was pH of 11 so 0.11 g $H_2SO_4$ added. The aqueous phase (3094.8 g) was removed. The cement stood for 10 hours 45 minutes and an additional aqueous phase (432.5 g) separated and was removed. The final cement analyzed 14.41 wt % polyaryloxyphosphazene, 0.67 wt % water and the balance solvent plus phenolic impurities. The following table compares the phenolic impurities in the initial cement to that in the final cement both expressed on a dry gum (ex, solvent) basis.

| Impurity | Wt Percent (dry gum basis) | |
| --- | --- | --- |
| | Before | After |
| phenol | 1.67 | 0.006 |
| p-ethylphenol | 0.48 | 0.012 |
| o-allylphenol | 0.02 | ND[1] |
| total | 2.17 | 0.018 |

[1]ND means none detected.

This represents a 99 percent reduction in the amount of phenolic impurity.

EXAMPLE 5

In a reaction vessel was placed 1089 lbs of polyaryloxyphosphazene cement and 604.5 lbs of a solution consisting of:
- 61.4 wt % water
- 36.1 wt % methanol
- 2.5 wt % NaOH The mixture was stirred 15 minutes and then allowed to settle. The aqueous phase (722 lbs) was removed.

The remaining cement was then washed with 443 lbs of a solution consisting of:
- 46.8 wt % water
- 49.6 wt % methanol
- 3.6 wt % NaOH This was stirred 15 minutes and then allowed to settle. The aqeuous phase (684 lbs) was then removed. Then 441 lbs of a solution consisting of:
- 50 wt % water
- 49.983 wt % methanol
- 0.017 wt % $H_2SO_4$ (93 wt %)

was added to the cement. The mixture was stirred 15 minutes and then allowed to settle. The aqueous phase was at pH=11. A solution of 15 g of $H_2SO_4$ in 9 lbs of water was added and the mixture stirred 15 minutes. The aqueous phase Was at pH=9.5. A solution of 21 g of $H_2SO_4$ in 11 lbs of water was added and the mixture stirred 15 minutes. The aqueous phase was then at pH=4. The aqueous phase was removed and the cement analyzed. The cement contained 12.39 wt % polyaryloxyphosphazene which on a dry basis (ex, solvent) contained 0.011 wt % phenol and 0.004 wt % p-ethylphenol. This represents about a 99.3 percent reduction from the phenolics in the initial cement on the same dry basis.

As the above examples show, the present process can readily remove over 90 percent of the residual phenolic impurities from crude polyaryloxyphosphazene substitution product. This low phenolic gum is useful in making products such as electrical insulation, fire resistant foam cushions, foamed thermal insulation and the like.

We claim:

1. A process for removing phenolic impurities from a crude polyphosphazene gum having aryloxy substituents and containing phenolic impurities said process comprising:
   (A) forming a solution of said polyphosphazene in a solvent for said crude polyphosphazene,
   (B) extracting said crude polyphosphazene solution at least once with an aqueous lower alcohol solution of an alkali metal base to extract said phenolic impurities into the aqueous lower alcohol phase,
   (C) separating the organic phase containing the extracted purified polyphosphazene from the aqueous lower alcohol phase and
   (D) recovering purified polyaryloxyphosphazene gum from said organic phase.

2. A process of claim 1 wherein said lower alcohol is methanol or isopropanol or mixtures thereof.

3. A process of claim 2 wherein said alkali metal base is an alkali metal hydroxide.

4. A process of claim 3 wherein said alkali metal hydroxide is sodium hydroxide.

5. A process of claim 1 wherein said aqueous lower alcohol solution comprises about 10–60 weight percent lower alcohol and about 0.1–5 weight percent alkali metal base.

6. A process of claim 5 wherein said phenolic impurities are phenol or lower-alkylphenols or mixtures thereof.

7. A process of claim 6 wherein said alkali metal base is sodium hydroxide and said lower alcohol is methanol.

8. In a process for making a purified polyaryloxyphosphazene gum, said process comprising reacting a substantially linear high molecular weight polyphosphonitrilic chloride with a sodium aryloxide, said reacting being conducted in a solvent to form a solution of said polyaryloxyphosphazene gum containing aryl hydroxy impurities, the improvement comprising extracting said solution at least once with an aqueous lower-alcohol alkali metal hydroxide solution to remove a substantial portion of said arylhydroxy impurities.

9. A process of claim 8 wherein said aqueous lower-alcohol alkali metal hydroxide solution comprises about 10–60 weight percent methanol and about 0.1–5 weight percent sodium hydroxide.

10. A process of claim 9 wherein the amount of methanol is about 12–50 pph, the amount of sodium hydroxide is about 0.4–1.2 pph and the amount of water is about 15–40 pph, wherein pph means parts per hundred parts by weight of said solution of said polyaryloxyphosphazene cement.

11. A process of claim 10 wherein said sodium aryloxide is a mixture of about 30–70 mole percent sodium phenoxide, about 30–70 mole percent sodium p-ethylphenoxide and zero up to 20 mole percent of sodium o-allylphenoxide, based on the total moles of sodium aryloxide.

12. A process of claim 11 wherein said solvent in which said phosphonitrilic chloride is reacted with said sodium aryloxide is a tetrahydrofuran/cyclohexane mixture.

* * * * *

UNITED STATES PATENT AND TRADEMARK OFFICE
CERTIFICATE OF CORRECTION

PATENT NO. : 4,789,728                                                            Page 1 of 2

DATED : December 6, 1988

INVENTOR(S) : J. Robert Adams, Jr.

It is certified that error appears in the above-identified patent and that said Letters Patent is hereby corrected as shown below:

Column 3, line 62-63 reads "polyaryloxphosphazene" and should read -- polyaryloxyphosphazene --.

Column 5, line 9 reads "asffillers" and should read -- as fillers --.

Column 6, line 8 reads "oonduoted" and should read -- conducted --.

Column 6, line 8 reads "reaotinq" and should read -- reacting --.

Column 6, line 10 reads "oyclohexane" and should read -- cyclohexane --.

Column 6, line 11 reads "polyphosphonitrilio) and should read -- polyphosphonitrilic --.

Column 6, line 27 reads "allowdd" and should read -- allowed --.

UNITED STATES PATENT AND TRADEMARK OFFICE
CERTIFICATE OF CORRECTION

PATENT NO. : 4,789,728
DATED : December 6, 1988
INVENTOR(S) : J. Robert Adams, Jr.

It is certified that error appears in the above-identified patent and that said Letters Patent is hereby corrected as shown below:

Column 7, line 66 reads "Was" and should read -- was --.

Column 8, line 65 reads "cement" and should read -- gum --.

Signed and Sealed this

Seventh Day of March, 1989

Attest:

DONALD J. QUIGG

Attesting Officer

Commissioner of Patents and Trademarks